(12) United States Patent
Gualtieri

(10) Patent No.: US 7,683,791 B2
(45) Date of Patent: Mar. 23, 2010

(54) AIRCRAFT ICING SENSOR

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 266 days.

(21) Appl. No.: 11/832,771

(22) Filed: Aug. 2, 2007

(65) Prior Publication Data

US 2009/0033502 A1  Feb. 5, 2009

(51) Int. Cl.
*G08B 19/02* (2006.01)

(52) U.S. Cl. .................... 340/580; 340/581; 73/583; 73/589

(58) Field of Classification Search ............ 340/580, 340/500, 540, 693.6, 581–583; 73/573, 579, 73/589, 645, 650, 659; 367/137, 162
See application file for complete search history.

(56) References Cited

U.S. PATENT DOCUMENTS

| | | | | |
|---|---|---|---|---|
| 4,688,185 A * | 8/1987 | Magenheim et al. | ......... | 702/172 |
| 5,005,015 A * | 4/1991 | Dehn et al. | .................. | 340/962 |
| 5,206,806 A * | 4/1993 | Gerardi et al. | .............. | 340/582 |
| 5,495,252 A * | 2/1996 | Adler | .......................... | 342/127 |
| 5,617,076 A * | 4/1997 | Stern | .......................... | 340/583 |
| 5,682,788 A * | 11/1997 | Netzer | ............................ | 73/73 |
| 5,801,307 A * | 9/1998 | Netzer | ..................... | 73/170.17 |
| 5,838,239 A * | 11/1998 | Stern et al. | ................... | 340/583 |
| 5,900,820 A * | 5/1999 | Yankielun | ..................... | 340/580 |
| 6,154,167 A * | 11/2000 | Annan et al. | ................... | 342/22 |
| 6,281,688 B1 * | 8/2001 | Yankielun | ..................... | 324/643 |
| 6,505,509 B2 | 1/2003 | Gualtieri | | |
| 6,518,497 B1 * | 2/2003 | Allaire et al. | ............. | 174/40 R |
| 6,849,852 B2 * | 2/2005 | Williamson | .............. | 250/341.6 |
| 6,995,572 B2 * | 2/2006 | Arndt et al. | .................. | 324/639 |
| 7,000,871 B2 * | 2/2006 | Barre et al. | .............. | 244/134 F |
| 7,026,943 B2 * | 4/2006 | Knowles et al. | ............. | 340/582 |
| 7,092,840 B2 | 8/2006 | Gualtieri | | |
| 7,103,460 B1 * | 9/2006 | Breed | ......................... | 701/29 |
| 2004/0149734 A1 * | 8/2004 | Petrenko et al. | ............. | 219/538 |
| 2005/0016278 A1 * | 1/2005 | Knowles et al. | ............... | 73/592 |
| 2007/0046478 A1 * | 3/2007 | Crisman | ..................... | 340/580 |
| 2007/0113646 A1 * | 5/2007 | Maatuk | ....................... | 73/295 |

* cited by examiner

*Primary Examiner*—Davetta W Goins
*Assistant Examiner*—Hoi C Lau
(74) *Attorney, Agent, or Firm*—Fogg & Powers LLC

(57) ABSTRACT

An apparatus for detecting the presence of ice includes a sensor including a radio-frequency transmission line providing a characteristic impedance, a source coupled to the transmission line and operable to inject a wave into the transmission line, a summer operable to create standing wave, the standing wave including the sum of the injected wave and a reflected wave reflected by the end of the transmission line, the summer being connected between the source and the transmission line, and a detector for detecting the voltage of the standing wave. An embodiment may further include a comparator operable to compare the detected voltage with reference data for determining the presence of ice contacting the sensor.

19 Claims, 3 Drawing Sheets

AIRCRAFT ICING SENSOR

FIELD OF THE INVENTION

Embodiments of the invention relate generally to an apparatus and method for detecting the presence of ice on a surface. More particularly, the present invention utilizes standing wave reflectivity of a transmission line to detect the presence of ice on a surface to which the transmission line may be coupled.

BACKGROUND OF THE INVENTION

Heavy freezing drizzle can cause extensive engine damage in jets waiting for takeoff. Often, freezing drizzle can appear to be only harmless light drizzle to even trained meteorologists, with the result that preventative or remedial de-icing is not done. The National Center for Atmospheric Research reported that two cases of heavy freezing drizzle at Denver International Airport on Oct. 31, 2002, and the same date in 2003, caused a total of $2.85 million in damage to 18 jet engines on United Airlines 737 aircraft.

SUMMARY OF THE INVENTION

In an embodiment of the invention, an apparatus for detecting the presence of ice includes a sensor including a radio-frequency transmission line providing a characteristic impedance, a source coupled to the transmission line and operable to inject a wave into the transmission line, a summer operable to create a standing wave, the standing wave including the sum of the injected wave and a reflected wave reflected by the end of the transmission line, the summer being connected between the source and the transmission line, and a detector for detecting the voltage of the standing wave. An embodiment may further include a comparator operable to compare the detected voltage with reference data for determining the presence of ice contacting the sensor.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Embodiments of the present invention may utilize components and principles described in U.S. Pat. No. 6,505,509, entitled "Apparatus and Method for Measuring the Level of a Fluid," issued Jan. 14, 2003, which is hereby incorporated by reference in its entirety as if fully set forth herein.

When the electrical length of a transmission line is an $(n+\frac{1}{4})$ multiple of the wavelength of a driving radio frequency signal, there is destructive interference of the incident and reflected waves at the driven end, and a resulting voltage null. As the length varies from this condition, the interference condition is not met, and there is a net voltage at the driven end. The dielectric material from which transmission lines are constructed reduces the speed of light in the transmission line. One parameter used to specify coaxial cable is the velocity factor, which is the ratio of the transmission speed in the cable to the speed of light in a vacuum. This is typically 65-80% for flexible 50-ohm cable. In resonant transmission line (RTL) sensors, the physical length of the transmission line is held constant, but the electrical length is changed when a dielectric, either fluid or solid, changes the speed of light in the transmission line.

When the length of the transmission line is an $(n+\frac{1}{4})$ multiple of the wavelength, there is destructive interference and the signal strength is a minimum. As the length varies from this condition, the interference condition is not met, and there is a net voltage at the driven end.

Figure 1:
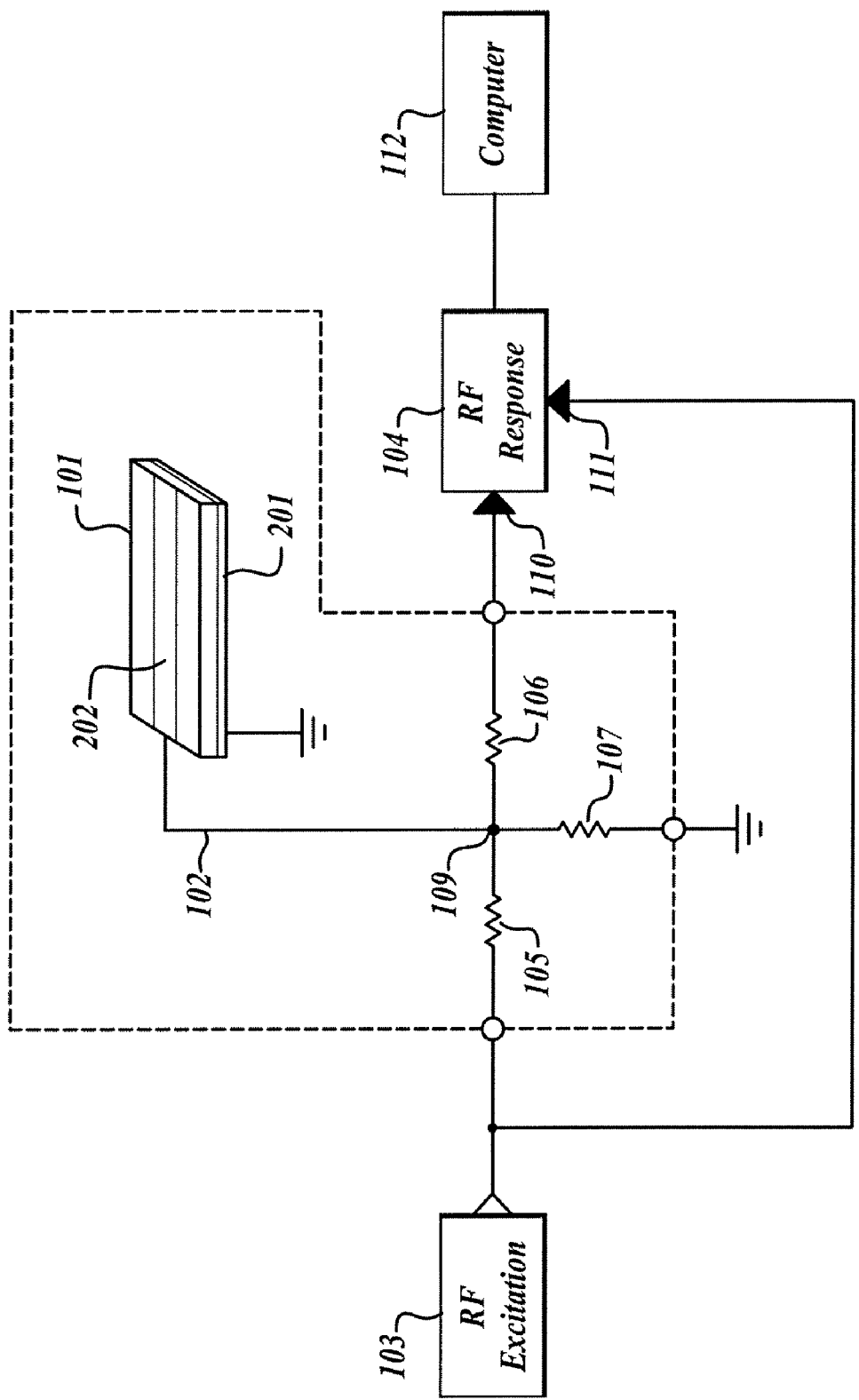
FIG. 1 is a schematic view of an apparatus operable to measure standing wave voltage according to an embodiment of the present invention.

FIG. 1 depicts a sensory system according to an embodiment of the present invention and used to measure standing wave voltage. Shown in FIG. 1 are a sensor 101, a ground plane 201, which is shown connected to ground, a cable 102 shown connected to a conductive stripline 202 of the sensor 101, a resistor "T" network (comprised of resistors 105, 106, and 107), an RF excitation source, which, in an embodiment, may be a frequency synthesizer 103, a voltage detector, which, in an embodiment, may include a lock-in amplifier 104, and a computer 112. The frequency synthesizer 103 may be used to inject a sine or other appropriate wave into the cable 102 and the sensor 101 (the combination of which may hereinafter be referred to as the "sensing element") at the input 109 of the sensing element. The injected wave reflects back from the end of the sensing element, where the resistor "T" network adds the voltage of the injected wave to the voltage of the reflected wave, the sum of which is input into signal port 110 on the lock-in amplifier 104. The far end of the sensing element may be open, and the open end reflects the signal because of an impedance discontinuity from its nominal impedance (e.g., 50 ohms) to infinite impedance at the open end. The initial injected wave may also be sent to a reference port 111 on the lock-in amplifier to serve as a calibration reference. The computer 112 may subsequently receive an indication of the standing wave voltage and compare this detected voltage with reference data to determine the presence of ice contacting the sensor 101. Such reference data may include, for example, voltages associated with stripline impedances, as described in further detail below, that correspond to the presence of ice on or near the sensing element.

As alluded to in the above discussion of FIG. 1, embodiments of the present invention employ embedded striplines to aid in ice detection. An embedded stripline may be a transmission line formed when a conductor is embedded in a dielectric between two ground planes. This is an effective geometry for sensors, since the ground planes offer shielding from stray signals.

Figure 2:
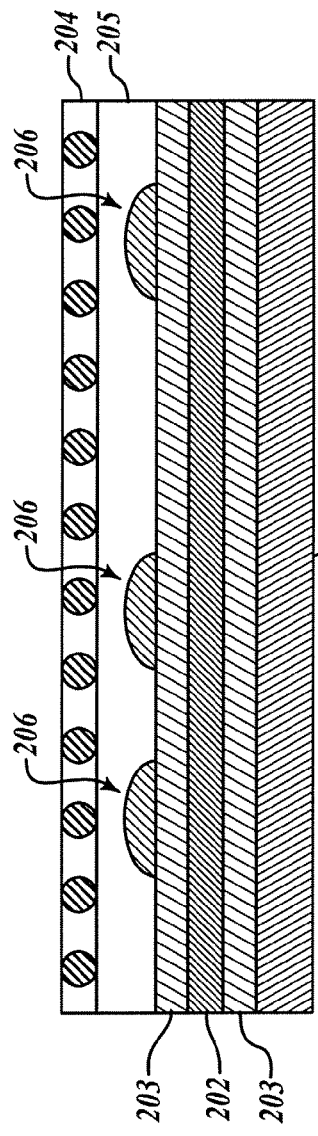
FIG. 2 is a partial cross-sectional view of a sensor according to an embodiment of the invention.

FIG. 2 illustrates a sensor construction according to an embodiment of the invention. The stripline 202 is embedded in a layer 203 of dielectric, such as ceramic. The layer 203 separates the stripline 202 from the conductive bottom ground plane 201. An upper ground plane 204 may include a permeable wire screen, thereby allowing water droplets 206 or other precipitation to enter a region 205 between the stripline 202 and the upper ground plane. In an embodiment the ground planes 201, 204 are electrically coupled to one another.

Figure 3:
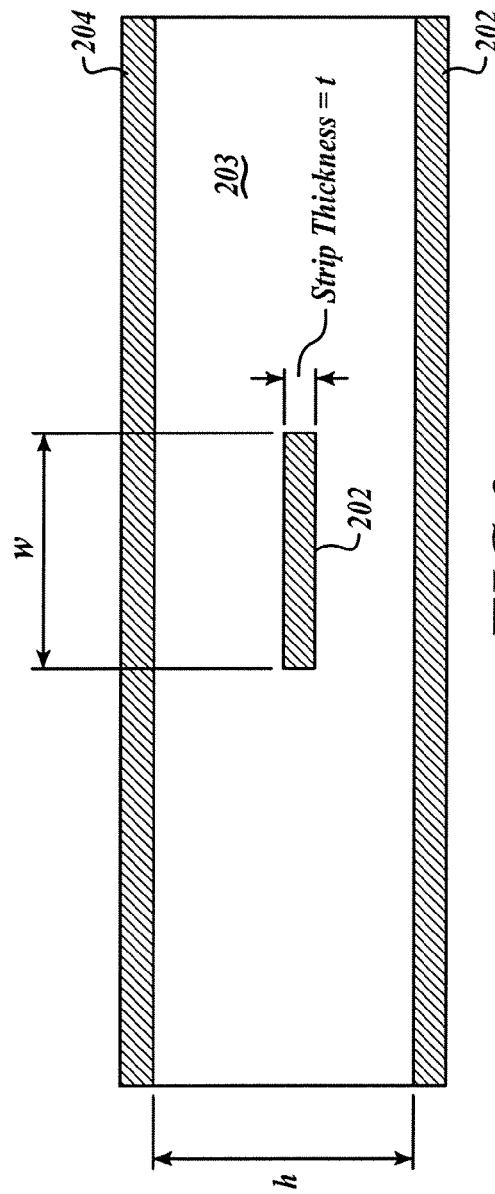
FIG. 3 is a second partial cross-sectional view of the sensor illustrated in FIG. 2.

Referring now to FIG. 3, the impedance of an embedded stripline, such as the stripline 202 illustrated in FIG. 2, is given approximately by:

$$Z=60(\in)^{-1/2} \ln [4h/(0.67\pi w(0.08(t/w)]$$

Where ∈ is the dielectric constant of the dielectric layer, and the dimensional parameters are defined in FIG. 3. When the trace thickness is very small, the equation can be simplified, as follows $$Z=60(\in)^{-1/2} \ln [2.38h/w]$$

The operating principle of the sensory system of an embodiment is based on the large difference in dielectric constant between liquid water (approximately 80) and ice (approximately 3.2). Water will cause a large decrease in the resonant frequency of the stripline 202.

Figure 4:
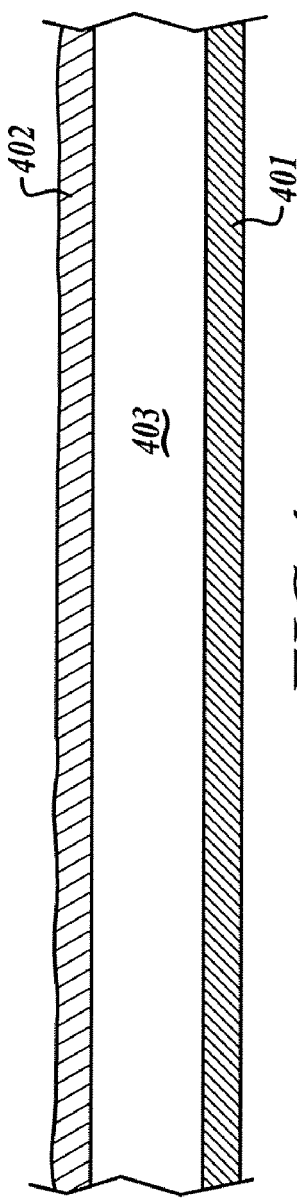
FIG. 4 is a partial cross-sectional view of a sensor according to an alternative embodiment of the invention.

Referring now to FIG. 4, illustrated is an alternative embodiment of a sensor construction that may be implemented in the sensory system illustrated in FIG. 1. A stripline 402 is disposed on a layer 403 of dielectric, such as ceramic. The layer 403 separates the stripline 402 from a conductive bottom ground plane 401. In an embodiment, a layer of hydrophilic material, such as cellophane tape (not shown), may be placed along the stripline 402 and dielectric layer 403 to prevent water pooling.

There is a large resonance change between water and ice, but not between ice and dry condition. In a sensory system according to an embodiment of the invention, an icing sensor is constructed in a differential fashion in which at least one stripline is heated to melt accumulated ice. The stripline conductor may serve as the heating element. The reference sensor may be balanced against the icing sensor, and, consequently, the dry and ice conditions may be differentiated. A pulsed heater may operate on a single stripline to differentiate ice/wet/dry condition if icing detection is only required at time intervals longer than about a minute.

Figure 5:
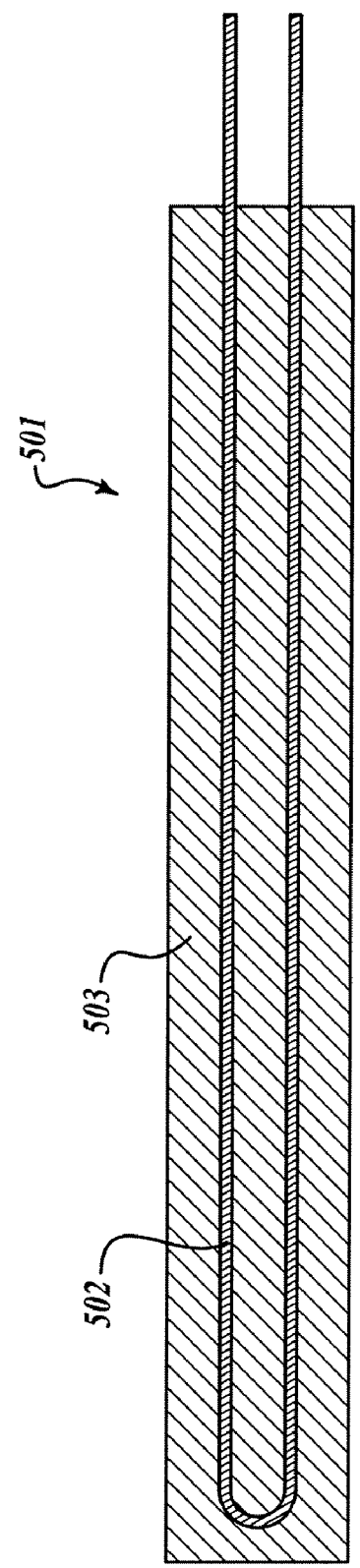
FIG. 5 is a top view of a reference stripline implementable in an embodiment of the invention.

Alternatively, and referring now to FIG. 5, an embodiment of the invention includes a sensor architecture that has a sensing stripline, such as stripline 202, and a nearby reference stripline 501. The reference stripline 501 may include a conductive wire 502 disposed on a dielectric layer 503. The reference stripline 501 may be heated and, as a consequence, ice will not form on it. To isolate the heater from radio frequencies, small inductors (not shown) may be placed at each end of the heater wire 502.

While a preferred embodiment of the invention has been illustrated and described, as noted above, many changes can be made without departing from the spirit and scope of the invention. For example, an embodiment of the invention includes a sensor that may be embedded into a composite wing structure. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for detecting the presence of ice and comprising:
    a sensor operable to be coupled to a surface exposed to moisture and comprising a radio-frequency transmission line providing a characteristic impedance, wherein the transmission line comprises an inner conductor and a first outer conductor proximate to said inner conductor, the first outer conductor being spaced from the inner conductor by dielectric material;
    a source coupled to the transmission line and operable to inject a wave into the transmission line;
    a summer operable to create a standing wave, the standing wave comprising the sum of the injected wave and a reflected wave reflected by the end of the transmission line, said summer being connected between the source and the transmission line;
    a detector for detecting a voltage of the standing wave; and
    a comparator operable to compare the detected voltage with reference data for determining the presence of ice contacting the sensor.

2. The apparatus of claim 1, wherein the transmission line further comprises a second outer conductor, wherein the inner conductor is disposed between said first and second outer conductors.

3. The apparatus of claim 2, wherein the second outer conductor comprises a permeable screen.

4. The apparatus of claim 1, wherein the summer comprises a network including:
    a first resistor connected to the output of the source;
    a second resistor connected to the detector; and
    a third resistor connected to a system ground, and wherein each resistor is coupled to the transmission line.

5. The apparatus of claim 1, further comprising a heating element proximate to said sensor.

6. The apparatus of claim 1, further comprising a current source operable to provide current to said transmission line sufficient to raise the temperature of the transmission line to a predetermined level.

7. The apparatus of claim 5, wherein the wave is injected after raising the temperature of the heating element to a predetermined level.

8. The apparatus of claim 6, wherein the wave is injected after raising the temperature of the transmission line to the predetermined level.

9. A method for detecting the presence of ice on a surface, the method comprising the steps of:
    coupling to a first portion of the surface a first radio-frequency transmission line providing a characteristic impedance;
    introducing a first radio-frequency wave into the first transmission line;
    creating a first standing wave comprising a sum of the introduced first radio-frequency wave and a first reflected-wave reflected by the end of the first transmission line;
    detecting a first voltage of the first standing wave; and
    comparing the detected first voltage with reference data indicating the presence of ice.

10. The method of claim 9, wherein the first transmission line comprises an inner conductor and a first outer conductor proximate to said inner conductor, wherein the first outer conductor is spaced from the inner conductor by dielectric material.

11. The method according to claim 10, wherein the first transmission line further comprises a second outer conductor, wherein the inner conductor is disposed between said first and second outer conductors.

12. The method according to claim 11, wherein the second outer conductor comprises a permeable screen.

13. The method of claim 9, wherein the sum is generated by a "T" network including:
    a first resistor connected to the output of the source;
    a second resistor connected to the detector; and
    a third resistor connected to a system ground, and wherein each resistor is coupled to the first transmission line.

14. The method of claim 9, further comprising placing a heating element proximate to said first transmission line.

15. The method of claim 9, further comprising providing current to said first transmission line sufficient to raise the temperature of said first transmission line to a predetermined level.

16. The method of claim 9, further comprising:
placing on a second portion of the surface a second radio-frequency transmission line;
raising the temperature of the second transmission line to a predetermined level;
introducing a second radio-frequency wave into the second transmission line;
creating a second standing wave comprising a sum of the introduced second radio-frequency wave and a second reflected-wave reflected by the end of the second transmission line;
detecting a second voltage of the second standing wave; and
comparing the detected second voltage with the reference data.

17. The method of claim 14, wherein the first radio-frequency wave is introduced after raising the temperature of the heating element to a predetermined level.

18. The method of claim 15, wherein the first radio-frequency wave is introduced after raising the temperature of the first transmission line to the predetermined level.

19. The method of claim 18, further comprising determining a dry condition of the surface based on the comparison.

* * * * *